(12) United States Patent
Billings

(10) Patent No.: US 11,603,637 B1
(45) Date of Patent: Mar. 14, 2023

(54) WAVE ATTENUATOR SYSTEM

(71) Applicant: David Billings, Birmingham, AL (US)

(72) Inventor: David Billings, Birmingham, AL (US)

(*) Notice: Subject to any disclaimer, the term of this patent is extended or adjusted under 35 U.S.C. 154(b) by 0 days.

(21) Appl. No.: 17/868,111

(22) Filed: Jul. 19, 2022

Related U.S. Application Data

(60) Provisional application No. 63/224,243, filed on Jul. 21, 2021.

(51) Int. Cl.
  *E02B 3/06* (2006.01)

(52) U.S. Cl.
  CPC .................................. *E02B 3/064* (2013.01)

(58) Field of Classification Search
  CPC ...................................................... E02B 3/064
  See application file for complete search history.

(56) References Cited

U.S. PATENT DOCUMENTS

| | | | | |
|---|---|---|---|---|
| 5,242,243 A * | 9/1993 | Bachelier | ................ | E02B 3/062 405/23 |
| 5,688,075 A * | 11/1997 | Gradek | ............... | E02B 15/0814 405/63 |
| 6,485,229 B1 * | 11/2002 | Gunderson, III | ..... | E02B 15/085 405/63 |
| 7,140,599 B1 * | 11/2006 | Spink | .................... | E02B 15/085 405/71 |
| 8,807,869 B1 * | 8/2014 | Lee | ......................... | B63B 22/20 405/27 |
| 9,410,300 B2 * | 8/2016 | Atilano | .................... | E02B 3/062 |
| 9,624,636 B2 * | 4/2017 | Andrus | ..................... | E02B 3/06 |
| 10,724,195 B2 * | 7/2020 | Carney | .................... | E02B 5/085 |
| 2005/0271470 A1 * | 12/2005 | Rytand | ..................... | E02B 3/06 405/23 |
| 2007/0283866 A1 * | 12/2007 | Veazey | ..................... | B63C 1/04 114/77 R |
| 2010/0196098 A1 * | 8/2010 | Danskine | ................ | E02B 3/062 405/27 |
| 2015/0152614 A1 * | 6/2015 | Burt | ......................... | E02B 3/062 405/23 |

FOREIGN PATENT DOCUMENTS

| | | | | |
|---|---|---|---|---|
| CN | 202099780 U | * | 1/2012 | ............... E02B 3/04 |
| FR | 2910433 A1 | * | 6/2008 | ............. B63B 39/10 |
| WO | WO-2014013484 A1 | * | 1/2014 | ............... B28B 7/00 |

* cited by examiner

*Primary Examiner* — S. Joseph Morano
*Assistant Examiner* — Jovon E Hayes
(74) *Attorney, Agent, or Firm* — Taylor English Duma

(57) ABSTRACT

A wave attenuator system for protecting a floating dock or other structure from incoming wake created by wind or vessel is disclosed herein, in various aspects. The wave attenuator system may include a substantially rectangular curtain made of a water-impermeable flexible material, in various aspects. The curtain top edge may be secured along the length of at least one of the sides of a dock, in various aspects. The curtain bottom edge may be suspended in a body of water a predetermined distance below the water surface, in various aspects. The bottom edge may include a weighted material to maintain the curtain in a substantially vertical orientation, in various aspects. The wave attenuator system is operable to redirect waves impacting the curtain downward to reduce wave action against the dock or other structure, in various aspects.

20 Claims, 5 Drawing Sheets

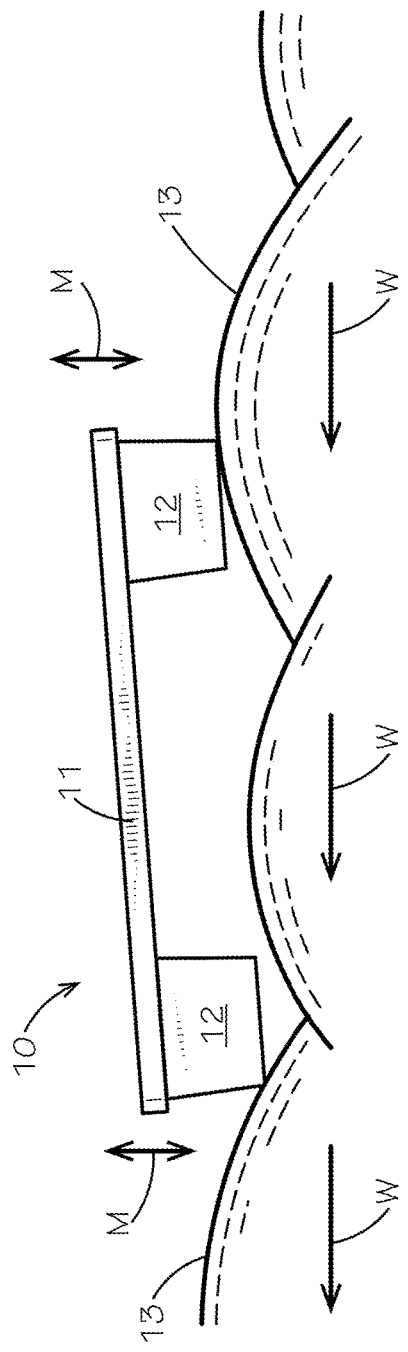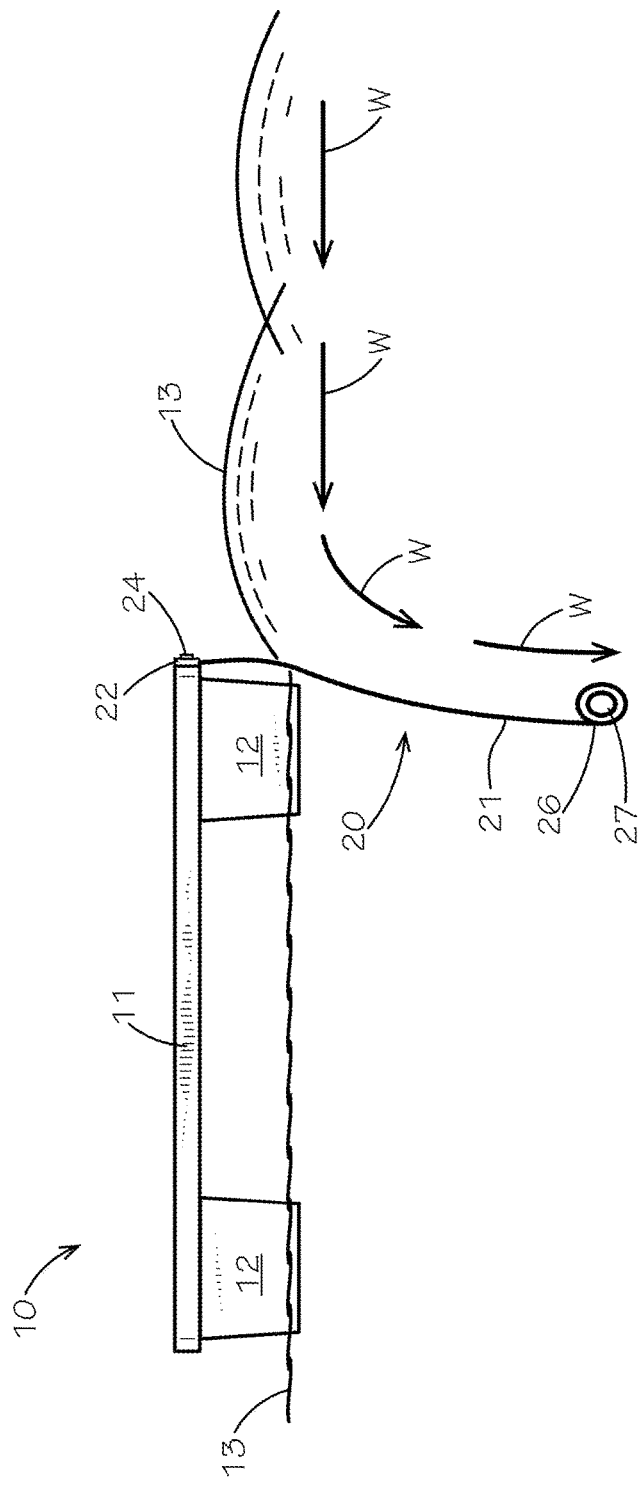

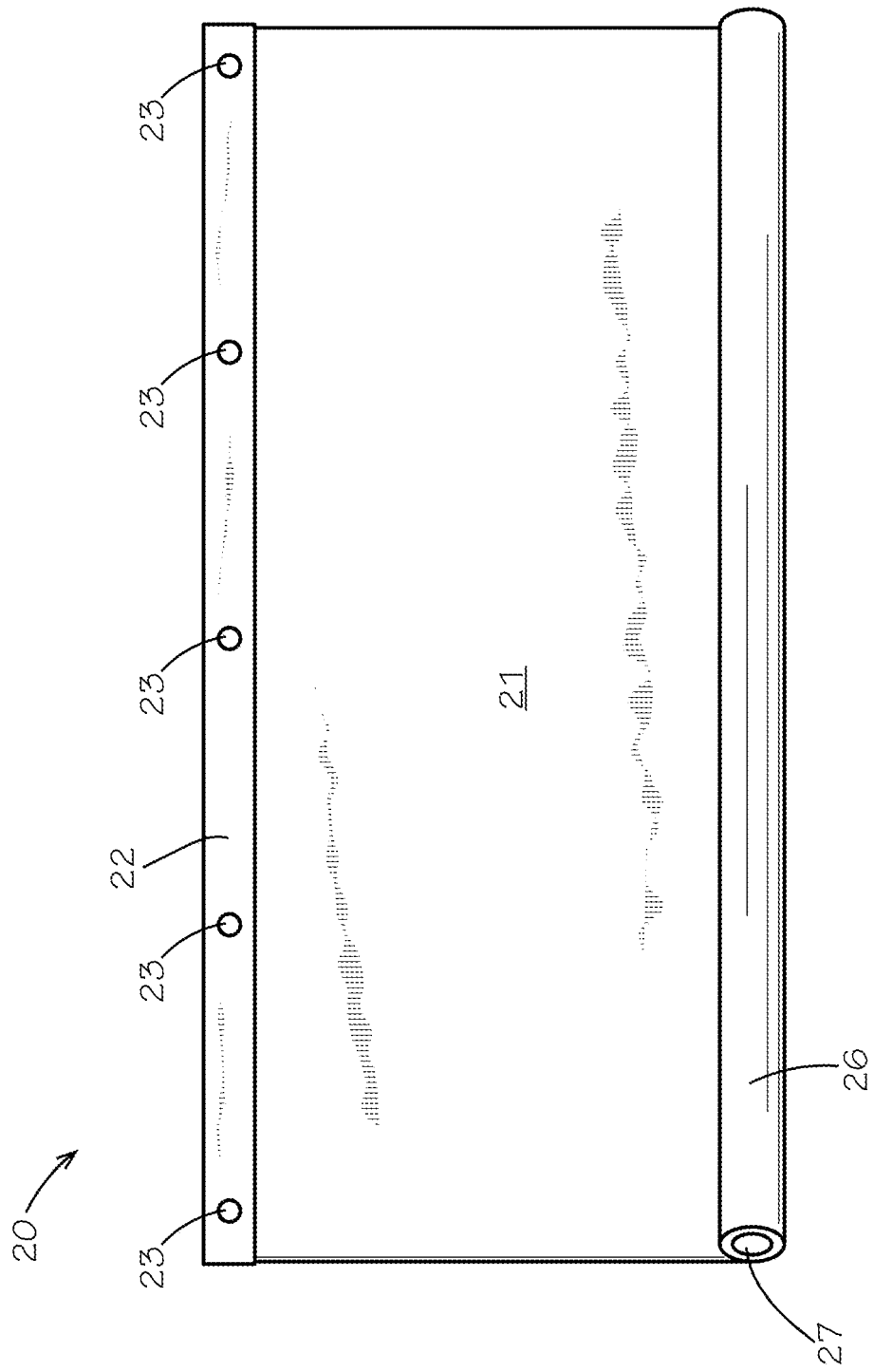

WAVE ATTENUATOR SYSTEM

CROSS-REFERENCE TO RELATED APPLICATIONS

The present application claims priority to and benefit of U.S. Provisional Patent Application No. 63/224,243, filed on Jul. 21, 2021, the disclosure of which is hereby incorporated by reference herein in its entirety.

FIELD OF THE INVENTION

The present disclosure relates to wave attenuators for reducing or preventing wave action against a floating dock or other structure.

BACKGROUND OF THE INVENTION

Floating docks typically comprise a platform supported by a plurality of floats. The dock may include a boat house or other structure. Floating docks are typically secured to the shore and are commonly anchored to the bottom surface of a body of water, such as a lake bottom, by one or more large concrete anchors that rest on the lake bottom and are attached to the dock frame by one or more cables and winches. These "deep-water anchors" help to secure a dock in place, but do not completely prevent the dock from moving up and down and side to side as waves move under the dock. Wave action, from wind or watercraft, wears on the dock and can interfere with people's use and enjoyment of the dock. Wave action can also lead to breakaway of the dock, which can lead to further damage as the free-floating dock impacts other objects.

In addition, the deep-water anchors are dangerous and cumbersome, and require ongoing adjustments to work properly. If the anchors are not properly adjusted, structural damage can occur costing thousands of dollars to repair. Also, installation of the anchors is expensive and requires permits and licensed installation personnel, and many permits are denied due to protected habitat. Finally, repairs and periodic maintenance can be expensive because of the need for experienced licensed personnel and specialized equipment.

What is needed is a wave attenuator for floating docks and other structures that is operable to effectively redirect waves away from the dock to prevent the up and down and side to side motion of the dock, that does not require anchoring to the lake bottom, and that is relatively inexpensive compared to currently used dock anchors.

SUMMARY OF THE INVENTION

These and other needs and disadvantages may be overcome by the apparatus disclosed herein. Additional improvements and advantages may be recognized by those of ordinary skill in the art upon study of the present disclosure.

The present disclosure relates to wave attenuator systems designed to protect a floating dock or other structure from the incoming wake created by wind or vessel. The wave attenuator system, as disclosed herein, may include a substantially rectangular curtain made of a water-impermeable flexible material, the curtain having a top edge and a bottom edge, in various aspects. The curtain top edge is adapted to be secured along the length of at least one of the plurality of sides of the platform, in various aspects. The curtain bottom edge is adapted to be suspended in the body of water a predetermined distance below the water surface, in various aspects. The bottom edge includes a weighted material to maintain the curtain in a substantially vertical orientation, in various aspects. The wave attenuator is operable to redirect waves impacting the curtain downward to reduce wave action against the dock, thereby relieving the dock structures from damaging stresses and reducing the overall uncomfortable motion to the dock, in various aspects.

This summary is presented to provide a basic understanding of some aspects of the apparatus disclosed herein as a prelude to the detailed description that follows below. Accordingly, this summary is not intended to identify key elements of the apparatus disclosed herein or to delineate the scope thereof.

BRIEF DESCRIPTION OF THE DRAWINGS

FIG. 1 is a side view showing wave action against an exemplary floating dock.

FIG. 2 is a side view showing wave action against a floating dock having an exemplary implementation of the wave attenuator system attached thereto.

FIG. 3 is a front view showing an exemplary implementation of the wave attenuator system.

Figure 4B:
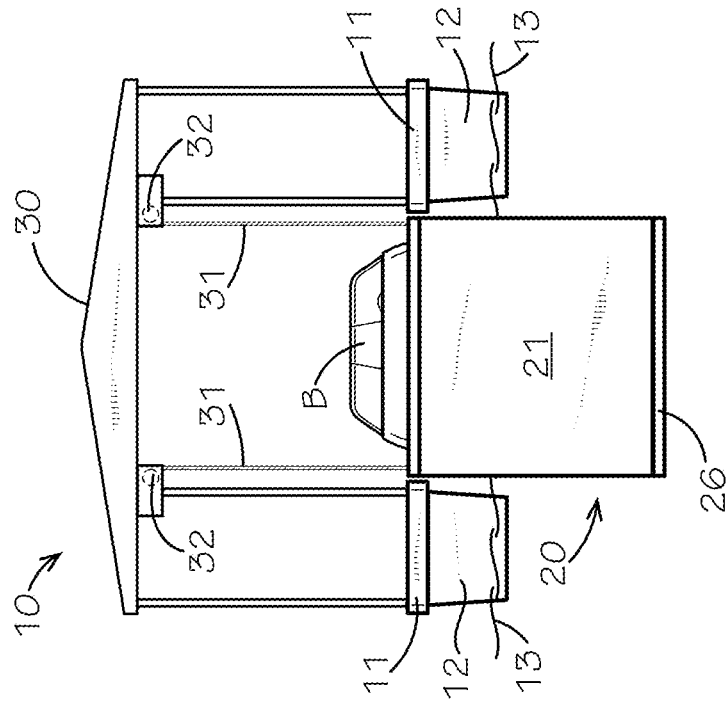
FIG. 4B is a front view showing the implementation of FIG. 4A in a raised position to protect the boat.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances as would be readily recognized by those of ordinary skill in the art upon study of this disclosure.

DETAILED DESCRIPTION OF THE INVENTION

FIG. 1 shows an exemplary floating dock 10 having a platform 11 (e.g., decking) and a plurality of floats 12. The floats 12 are secured to the bottom of the platform 11 and are operable to support the platform 11 above the water surface 13. Wave action, indicated by single direction arrows W, causes the dock 10 to move up and down and side to side, indicated by dual direction arrows M.

FIG. 2 shows the floating dock 10 of FIG. 1, having a platform 11 and a plurality of floats 12, wherein the dock 10 has an implementation of the wave attenuator 20 affixed to one side, the wave attenuator 20 shown in a side view, in various aspects. As the wave action, indicated by single direction arrows W, encounters the wave attenuator 20, the wave action is redirected downward towards the lake bottom.

FIGS. 2-3 show a preferred implementation of the wave attenuator 20, the wave attenuator 20 shown in a front view in FIG. 3, in various aspects. The wave attenuator 20 comprises a substantially rectangular curtain 21 made of a water-impermeable flexible material, such as a vinyl coated polyester fabric. The top edge 22 of the curtain 21 is preferably a reinforced vinyl webbing having a plurality of eyelets 23 (e.g., stainless steel grommets) therethrough so that a plurality of fasteners 24 (e.g., stainless steel screws) can be inserted through the eyelets 23 to secure the top edge 22 to the platform 11. The top edge 22 is preferably secured along its entire length to the platform 11. Alternate mechanisms for securing the top edge 22 to the platform 11 can be employed, such as linear guide rails (not shown) commercially available from, for example, W.W. Grainger, Inc. (Lake Forest, Ill.).

The bottom edge 26 of the curtain 21 is weighted to bias the curtain 21 downward to maintain the curtain 21 in a substantially vertical orientation, in various aspects. The bottom edge 26 is preferably a reinforced vinyl webbing that forms an elongated pocket for receiving a weighted material 27, such as a stainless steel rod. Other weighted materials, such as rocks or sand, could be used. The width of the curtain 21 is preferably commensurate with the width of the dock side to which the wave attenuator 20 is affixed. The height of the curtain 21 preferably allows the top edge 22 of the curtain 21 to be affixed to the platform 11 such that the bottom edge 26 is suspended in the water at least 3 feet below the water surface 13, and more preferably from 5 to 10 feet below the water surface 13, and most preferably from 5 to 7 feet below the water surface 13.

In use, the top edge 22 of the wave attenuator 20 is secured to at least one of the sides of the platform 11 based on the location(s) that waves typically impact the dock, in various aspects. The top edge 22 is preferably secured along its entire length to the platform 11. The weighted bottom edge 26 maintains the curtain 21 in a substantially vertical orientation. When incoming waves impact the curtain 21, the wave force W moves along the outer surface of the curtain 21 in a downward direction so that the wave does not materially impact the platform 11, illustrated in FIG. 2. The majority of the wave energy is redirected downward towards the lake bottom, thereby relieving the dock structures from damaging stresses and reducing the overall uncomfortable motion to the dock. This increases enjoyment of the dock, reduces wear and tear, and reduces overall costs of dock installation and/or maintenance.

Figure 4A:
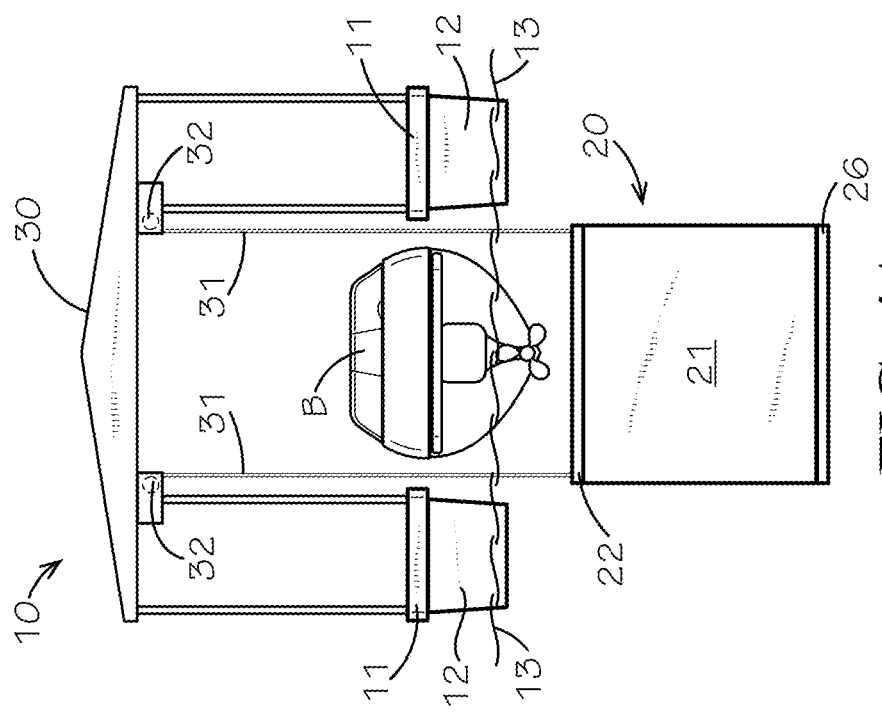
FIG. 4A is a front view showing an alternate exemplary implementation of the wave attenuator system attached to a boat slip and in a lowered position to allow ingress/egress of a boat.

In an alternate implementation shown in FIGS. 4A and 4B, the wave attenuator 20 is adjustably mounted across the inlet of a boat slip, in various aspects. The top edge 22 of the curtain 21 is preferably mounted via a pair of cables 31 to a winch or winch system 32. The winch system 32 is preferably mounted above the boat slip to a boat slip cover 30. The winch system 32 is operable to raise and lower the wave attenuator 20 as needed. FIG. 4A shows the wave attenuator 20 in a lowered position to allow ingress/egress of a boat B. FIG. 4B shows the wave attenuator 20 in a raised position to protect the boat B from wave action. The height of the curtain 21 preferably allows the bottom edge 26 to be suspended in the water at least 3 feet below the water surface 13, and more preferably from 5 to 10 feet below the water surface 13, and most preferably from 5 to 7 feet below the water surface 13, when the wave attenuator 20 is in the raised position.

Figure 5:
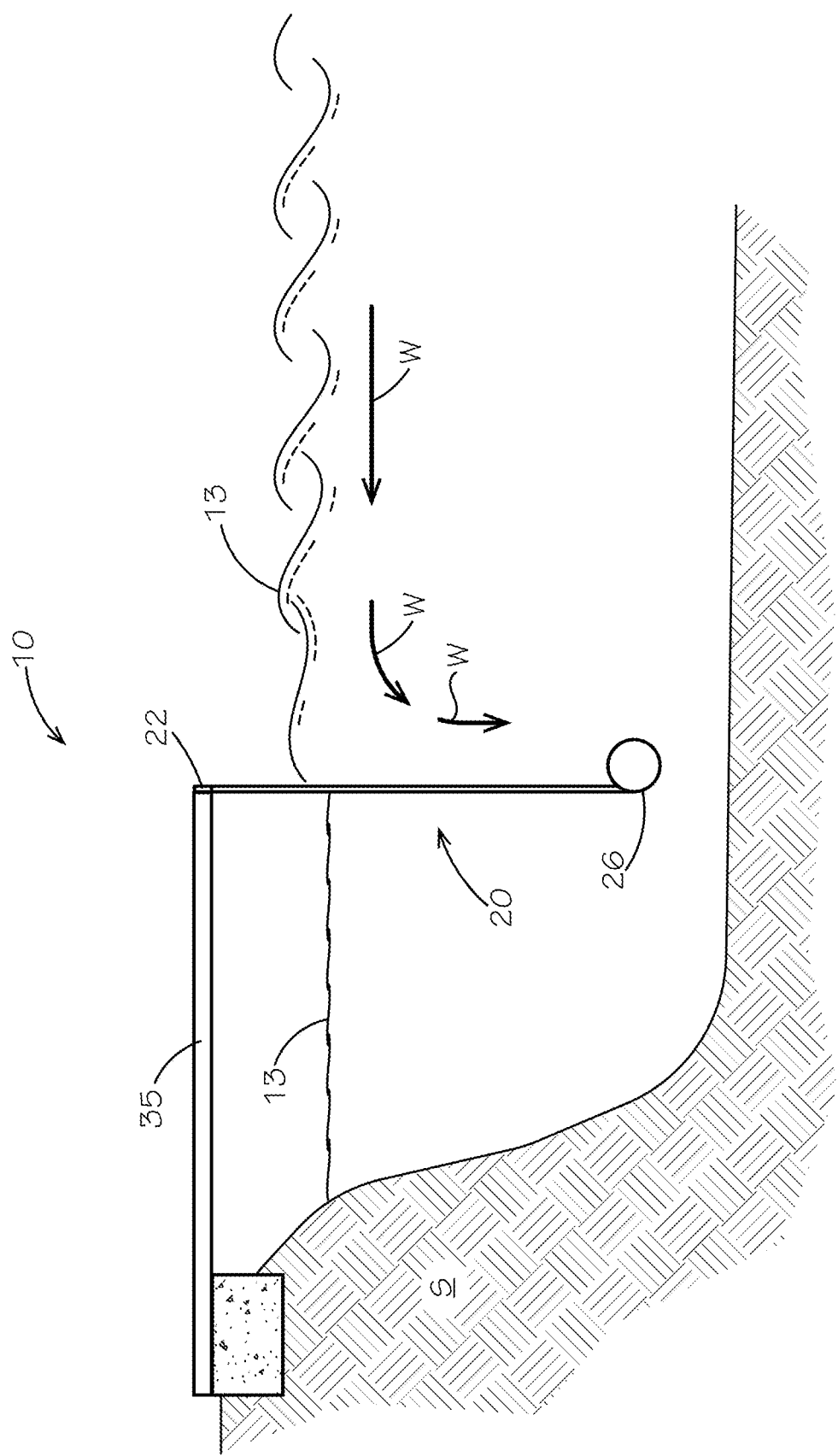
FIG. 5 shows another alternate exemplary implementation of the wave attenuator system protecting a shoreline from erosion.

In another alternate implementation shown in FIG. 5, the wave attenuator 20 is attached to one or more supports 35 that are anchored along the shoreline S and extend outward over the water, the wave attenuator 20 shown in a side elevation view, in various aspects. The top edge 22 of the curtain 21 is secured to the support(s) 35. The height of the curtain 21 preferably allows the bottom edge 26 to be suspended in the water at least 3 feet below the water surface 13, and more preferably from 5 to 10 feet below the water surface 13, and most preferably from 5 to 7 feet below the water surface 13. When deployed, the wave attenuator 20 protects the shoreline S from erosion. The wave attenuator 20 may be used to protect other structures, such as marina or harbor structures.

Figure 6A:
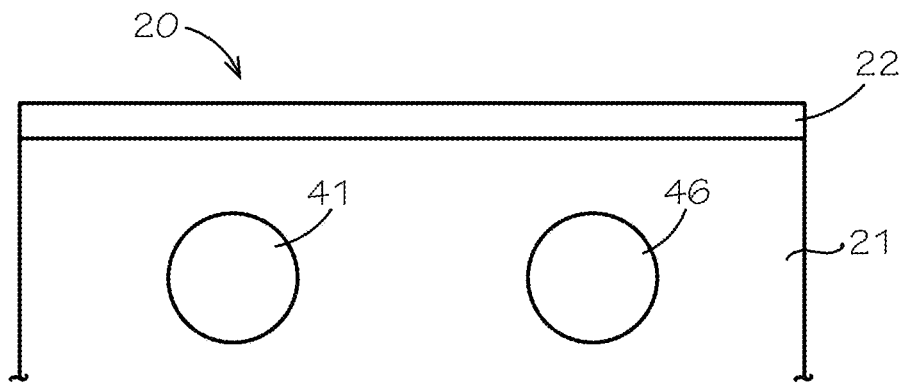
FIG. 6A is a front view showing another exemplary implementation of the wave attenuator system.
Figure 6B:
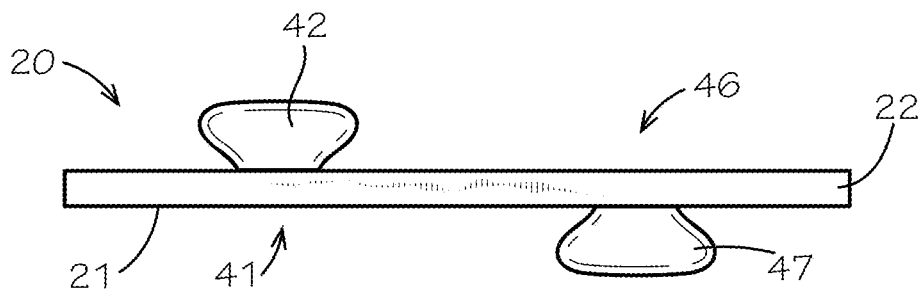
FIG. 6B is a top view showing the implementation of FIG. 6A with water-impermeable collection bags attached.
Figure 6C:
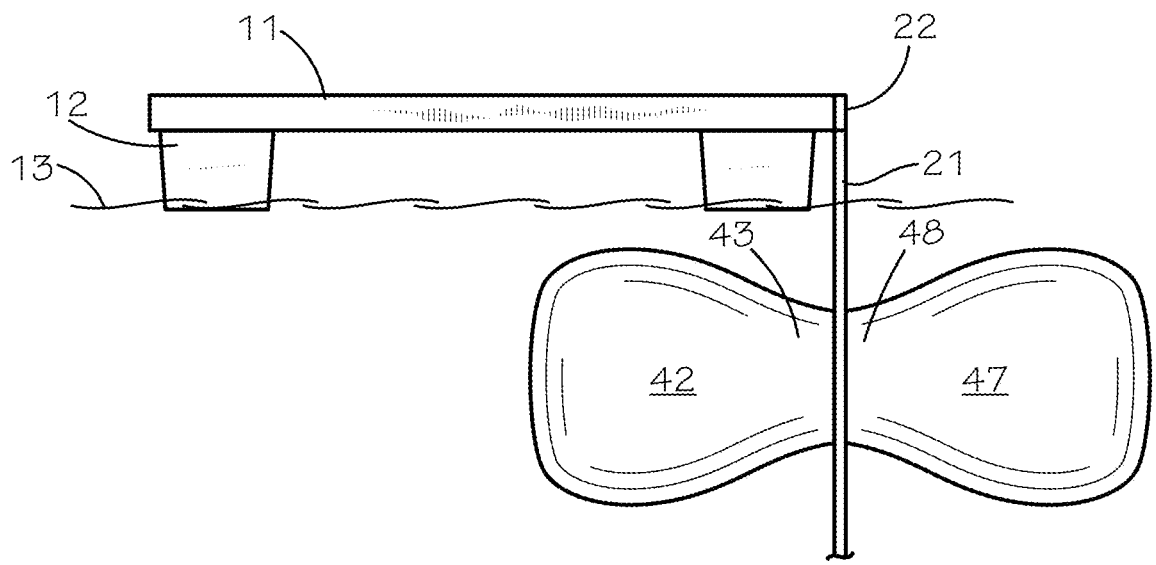
FIG. 6C is a side view showing the implementation of FIG. 6B attached to a floating dock.

In another alternate implementation shown in FIGS. 6A-6C, the wave attenuator 20 has a safety feature that slows movement of the dock in case of breakaway, such as during a storm having high winds, in various aspects. The wave attenuator 20 has at least one front side curtain opening 41 having a first collection bag 42 attached thereto, the first collection bag 42 being attached to the rear side of the curtain 21. The wave attenuator 20 has at least one rear side curtain opening 46 having a second collection bag 47 attached thereto, the second collection bag 47 being attached to the front side of the curtain 21. The openings 41, 46 are preferably round in shape. The collection bags 42, 47 are preferably made of a water-impermeable material, such as a vinyl coated polyester fabric. FIG. 6A is a front view showing the openings 41, 46 with the collection bags 42, 47 removed. The collection bags 42, 47 are preferably conical in shape, with the smaller diameter collection bag openings 43, 48 being attached to the curtain openings 41, 46, respectively. FIG. 6B is a top view showing the collection bags 42, 47 attached to the curtain openings 41, 46, respectively. As a breakaway dock is pushed by winds and waves, the collection bags 42, 47 fill with water, as shown in FIG. 6C, which causes drag and thereby slows the rate of speed of the dock in the water. This reduces the likelihood that the dock will be damaged or damage other structures as it is moved about.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus, methods, and manufactures disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A wave attenuator for a floating dock, the dock having a platform with a plurality of sides and at least one buoyant device for supporting the platform above the surface of a body of water, the wave attenuator comprising:

a substantially rectangular curtain made of a water-impermeable flexible material, the curtain having a top edge and a bottom edge, wherein the top edge is adapted to be secured along the length of at least one of the plurality of sides of the platform, wherein the bottom edge is adapted to be suspended in the body of water a predetermined distance below the water surface, wherein the bottom edge includes a weighted material to maintain the curtain in a substantially vertical orientation;

wherein the top edge has a plurality of eyelets therethrough for receiving a plurality of fasteners therethrough to secure the top edge to the platform, wherein the top edge is secured along its entire length to the platform;

wherein the wave attenuator is operable to redirect waves impacting the curtain downward to reduce wave action against the dock.

2. A wave attenuator for a floating dock, the dock having a platform with a plurality of sides and at least one buoyant device for supporting the platform above the surface of a body of water, the wave attenuator comprising:

a substantially rectangular curtain made of a water-impermeable flexible material, the curtain having a top edge and a bottom edge, wherein the top edge is adapted to be secured along the length of at least one of the plurality of sides of the platform, wherein the bottom edge is adapted to be suspended in the body of water a predetermined distance below the water surface, wherein the bottom edge includes a weighted material to maintain the curtain in a substantially vertical orientation;

wherein the bottom edge has an elongated pocket for receiving a stainless steel rod to bias the curtain downward to maintain the curtain in a substantially vertical orientation;

wherein the wave attenuator is operable to redirect waves impacting the curtain downward to reduce wave action against the dock.

3. A wave attenuator according to claim 1, wherein the width of the curtain is commensurate with the dock side to which the wave attenuator is attached and the height of the curtain allows the bottom edge to be suspended at least 3 feet below the water surface.

4. A wave attenuator according to claim 1, wherein the height of the curtain allows the bottom edge to be suspended from 5 to 10 feet below the water surface.

5. A floating dock adapted to float on the surface of a body of water, the floating dock having a boat slip, comprising:

a platform having a plurality of sides;

at least one buoyant device secured to the platform, the buoyant device operable to support the platform above the surface of the water;

a structure secured to a top side of the platform above the boat slip;

a wave attenuator adjustably mounted across the inlet of the boat slip, wherein the wave attenuator comprises a substantially rectangular curtain made of a water-impermeable flexible material, the curtain having a top edge and a bottom edge, wherein the top edge is adapted to be secured to the structure, wherein the bottom edge is adapted to be suspended in the body of water a predetermined distance below the water surface, wherein the bottom edge includes a weighted material to maintain the curtain in a substantially vertical orientation; and a lifting mechanism mounted to the structure, the mechanism operably attached to the top edge of the curtain for raising and lowering the curtain;

wherein the wave attenuator is operable to redirect waves impacting the curtain downward to reduce wave action against a boat housed in the boat slip when the curtain is in a raised position.

6. A floating dock according to claim 5, wherein the lifting mechanism is a winch system mounted to the structure above the boat slip, the winch system having a pair of cables attached to the top edge of the curtain, the winch system operable to raise and lower the curtain.

7. A floating dock according to claim 5, wherein the height of the curtain allows the bottom edge to be suspended at least 3 feet below the water surface when the curtain is in the raised position.

8. A wave attenuator according to claim 1, wherein the bottom edge has an elongated pocket for receiving a stainless steel rod to bias the curtain downward to maintain the curtain in a substantially vertical orientation.

9. A wave attenuator according to claim 1, wherein the weighted material is sand.

10. A wave attenuator according to claim 1, further comprising a first water-impermeable collection bag attached to a first opening through the curtain, the first water-impermeable collection bag attached to a rear side of the curtain so that water may enter the first water-impermeable collection bag from a front side of the curtain, wherein the first water-impermeable collection bag is adapted to fill with water to slow movement of the dock through the body of water.

11. A wave attenuator according to claim 10, further comprising a second water-impermeable collection bag attached to a second opening through the curtain, the second water-impermeable collection bag attached to the front side of the curtain so that water may enter the second water-impermeable collection bag from the rear side of the curtain, wherein the second water-impermeable collection bag is adapted to fill with water to slow movement of the dock through the body of water.

12. A wave attenuator according to claim 2, wherein the top edge has a plurality of eyelets therethrough for receiving a plurality of fasteners therethrough to secure the top edge to the platform.

13. A wave attenuator according to claim 2, wherein the width of the curtain is commensurate with the dock side to which the wave attenuator is attached and the height of the curtain allows the bottom edge to be suspended at least 3 feet below the water surface.

14. A wave attenuator according to claim 2, further comprising a first water-impermeable collection bag attached to a first opening through the curtain, the first water-impermeable collection bag attached to a rear side of the curtain so that water may enter the first water-impermeable collection bag from a front side of the curtain, wherein the first water-impermeable collection bag is adapted to fill with water to slow movement of the dock through the body of water.

15. A wave attenuator according to claim 14, further comprising a second water-impermeable collection bag attached to a second opening through the curtain, the second water-impermeable collection bag attached to the front side of the curtain so that water may enter the second water-impermeable collection bag from the rear side of the curtain, wherein the second water-impermeable collection bag is adapted to fill with water to slow movement of the dock through the body of water.

16. A wave attenuator according to claim 5, wherein the bottom edge has an elongated pocket for receiving a stainless steel rod to bias the curtain downward to maintain the curtain in a substantially vertical orientation.

17. A wave attenuator according to claim 5, wherein the weighted material is sand.

18. A wave attenuator for a floating dock, the dock having a platform with a plurality of sides and at least one buoyant device for supporting the platform above the surface of a body of water, the wave attenuator comprising:
- a substantially rectangular curtain made of a water-impermeable flexible material, the curtain having a top edge and a bottom edge, wherein the top edge is adapted to be secured along the length of at least one of the plurality of sides of the platform, wherein the bottom edge is adapted to be suspended in the body of water a predetermined distance below the water surface, wherein the bottom edge includes a weighted material to maintain the curtain in a substantially vertical orientation; and
- a first water-impermeable collection bag attached to a first opening through the curtain, the first water-impermeable collection bag attached to a rear side of the curtain so that water may enter the first water-impermeable collection bag from a front side of the curtain, wherein the first water-impermeable collection bag is adapted to fill with water to slow movement of the dock through the body of water;
- wherein the wave attenuator is operable to redirect waves impacting the curtain downward to reduce wave action against the dock.

19. A wave attenuator according to claim 18, further comprising a second water-impermeable collection bag attached to a second opening through the curtain, the second water-impermeable collection bag attached to the front side of the curtain so that water may enter the second water-impermeable collection bag from the rear side of the curtain, wherein the second water-impermeable collection bag is adapted to fill with water to slow movement of the dock through the body of water.

20. A wave attenuator according to claim 19, wherein the first and second water-impermeable collection bags are conical in shape.

* * * * *